March 14, 1933. F. D. CHAPMAN 1,901,083
HEAT TREATING EDIBLE SUBSTANCES
Filed Jan. 19, 1931
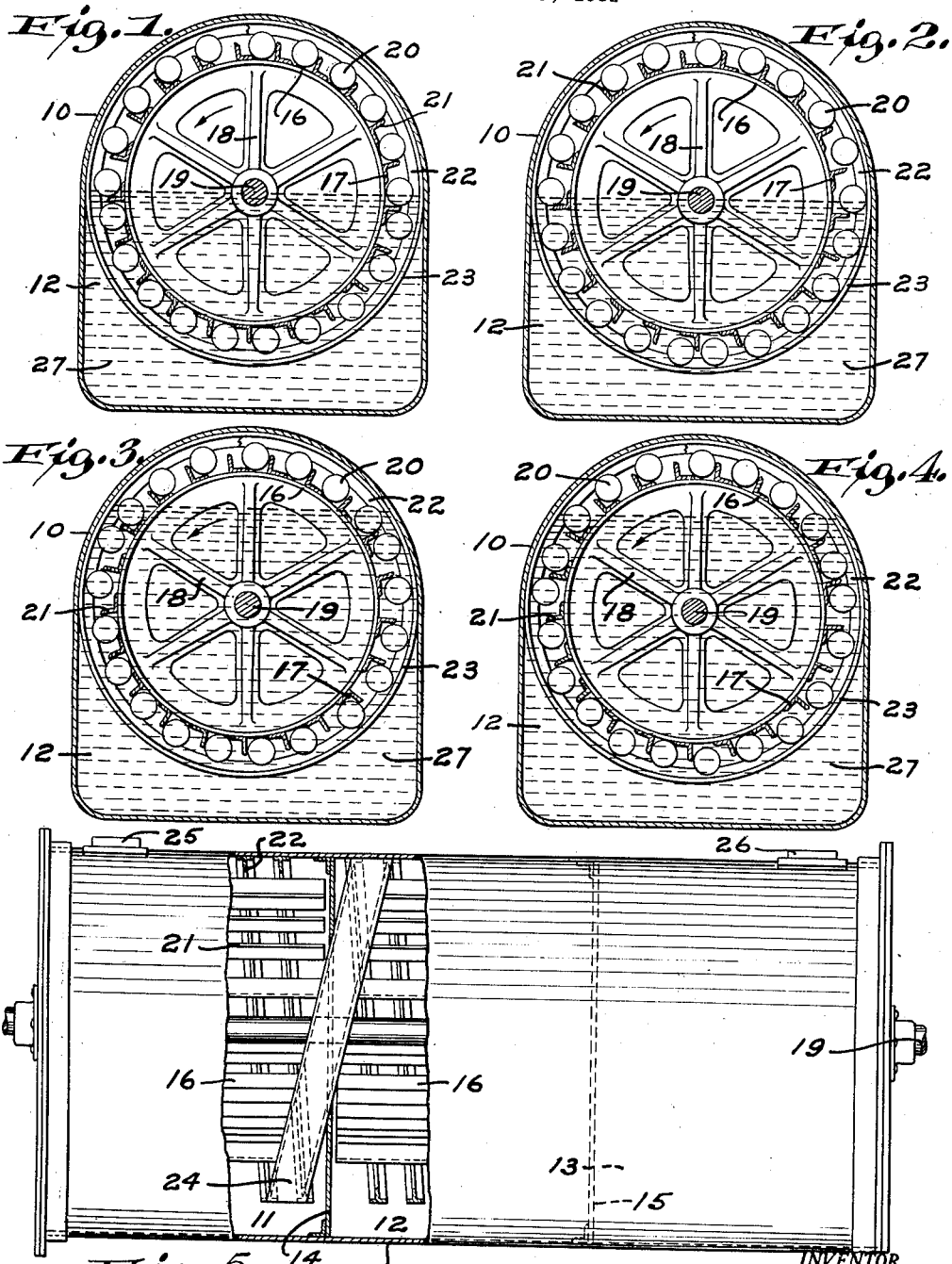

Patented Mar. 14, 1933

1,901,083

UNITED STATES PATENT OFFICE

FRANK D. CHAPMAN, OF BERLIN, WISCONSIN

HEAT TREATING EDIBLE SUBSTANCES

Application filed January 19, 1931. Serial No. 509,733.

The present invention relates in general to improvements in the art of heat treating materials, and relates more specifically to an improved process of cooking, sterilizing or otherwise heat treating food products, especially after batches thereof have been placed in receptacles such as tin cans.

Generally stated, an object of the invention is to provide an improved method of effectively heat treating various kinds of products such as foods.

The art of cooking and sterilizing edible commodities has presented many perplexing problems due to the variable characteristics of different materials, and even of the same classes of material under variable conditions of growth, production, age and treatment thereof. The purpose of these treatments is to place the products in palatable condition and to kill destructive bacteria therein, and the so-called processing must be accomplished quickly and effectively and preferably after batches of the material have been packed in containers such as tin cans or glass jars. These heat treating problems become extremely serious in connection with the treatment of delicate products such as milk, which products should not be detrimentally affected by the treatment and which should moreover be maintained in their natural condition with respect to taste, color and consistency, throughout the treating operation and thereafter. If such delicate products are subjected to excessive temperatures, for an improper period of time, certain ingredients therein may scorch, carmelize or be otherwise detrimentally affected, thus degrading the product; whereas undesirable agitation during part of or the entire heat treatment, may also have a deteriorating effect upon the product.

Prior to the present invention, it had been proposed to heat treat delicate liquids such as milk, after batches thereof had been placed in tin cans, by first subjecting the successive cans to initial heating so as to bring the temperature of the material up to a desired point, by subsequently additionally heating the canned product under pressure to effect sterilization, and by finally cooling the heat treated batches in a special cooler. With this prior process, a relatively long initial heating or "bringing up" time was required in order to prevent destruction of the product and cans, and this long bringing up period was objectionable since it resulted in discoloring, carmelization and other deterioration of the product. The heating medium utilized under this prior process, was pure water with a specific gravity and a specific heat of unity, and with a boiling point of 212 degrees F., thus making it necessary to employ a long bringing up period and also making it essential to finally heat treat the batches under pressure, since the temperatures necessary for sterilization are usually far beyond the boiling point of water.

It has been discovered that if delicate food products such as milk, as well as others, are submerged in a liquid having relatively low specific heat and a high boiling point, the bringing up time may be materially reduced without deterioration of the product. With the aid of such a liquid, the heat treatment may furthermore be effected without maintaining the submerging liquid under pressure, and the rate of heat penetration or transfer may readily be varied to suit the particular substance being treated, by merely changing the specific heat of the treating liquid. It is therefore preferable to employ a basic treating liquid which is freely soluble in pure water, and to utilize water to dilute the basic liquid in order to obtain any desired specific heat and boiling point of the heat treating mixture. Since the heat penetration or transfer varies substantially in accordance with variations in the specific heat of the heating medium, various materials may readily be subjected to the most effective heat treatment possible, by merely changing the proportions of water and basic liquid in the solution constituting the heating medium.

In view of the foregoing discovery, it is a more specific object of the present invention to provide a highly flexible process whereby various species of edible commodities may be quickly and effectively heat treated without in any manner degrading the same, especially after batches thereof have been packed in containers such as tin cans.

A clear conception of the procedure involved in the present improved method, may be had by referring to the drawing accompanying and forming a part of this specification in which like reference characters designate the same or similar parts in the several views:

Fig. 1 is a transverse vertical section through a machine for heat treating edible substances packed in cylindrical tin cans, showing the action of the cans when the machine is supplied to approximately the level of the central horizontal axis of the can transporting rotor, with one mixture of heating liquid;

Fig. 2 is a transverse vertical section through the machine, illustrating the action of the cans when the machine is supplied to approximately the central horizontal axis of the rotor, with another mixture of heating liquid;

Fig. 3 is a transverse vertical section through the machine showing the action of the cans when the machine is supplied to a level considerably above the can transporting rotor axis with still another mixture of heating liquid;

Fig. 4 is a transverse vertical section through the machine, illustrating the action of the cans when the machine is supplied to approximately the same level as in Fig. 3, with another mixture of heating liquid; and Fig. 5 is a somewhat diagrammatic part sectional side elevation of the machine with a portion of the main casing broken away in order to show internal structure.

While the improved process will be described herein in connection with a specific type of apparatus of well known construction, it should be understood that it is not contemplated to limit the scope of the invention by such specific disclosure, and that the method is capable of being exploited with other forms of machines.

In the drawing, the sterilizing or cooking machine comprises generally an elongated main casing 10 the interior of which is divided into three successive chambers 11, 12, 13 by means of partitions 14, 15; and a can conveying rotor having successive sections 16 rotatable within the chambers 11, 12, 13 about a common horizontal axis. Each of the rotor sections 16 consists of an annular series of parallel angle bars 17, secured to the periphery of a supporting spider 18, and the several spiders 18 are rotatably mounted upon a common horizontal shaft 19. The successive angle bars 17 are spaced apart laterally a sufficient distance to permit disposition of the cylindrical tin cans 20 therebetween, and the outer edges of the bar flanges 21 are movable in close proximity to the inner edges of flanges 22 forming part of the stationary spiral T-shaped guideways 23 which are secured within the main casing 10. The outwardly extending flanges 21 serve to propel the successive cans 20 around the axis of the shaft 19 during rotation of the transporting rotor, and the inwardly projecting spiral flanges 22 coact with the ends of the revolving cans 20 to gradually shift the same longitudinally of the rotor axis. The casing 10 is moreover provided with stationary transfer chutes 24 disposed adjacent to the partitions 14, 15, and these chutes are adapted to transfer the cans 20 in succession from one rotor section 16 to the next, without necessarily mixing the heating liquids confined within the successive chambers 11, 12, 13. One end of the main casing 10 is further provided with a can inlet 25 and the opposite casing end is provided with a can outlet 26, both of well-known construction.

Each of the successive chambers 11, 12, 13 is provided with a submerging basin of heating liquid 27, and the liquids in the several chambers may be of the same or different character and may be disposed at the same or at different levels in the successive basins. The heating liquids 27 in the successive basins may be heated to any desired temperature by means of steam coils or otherwise, and in accordance with the present invention, the heating liquid is preferably a solution consisting of predetermined proportions of water and another liquid having relatively low specific heat and a high boiling point. The heating liquid must moreover be non-poisonous when utilized for the heat treatment of food products, and should also be non-odorous since certain foods are capable of absorbing odors. When tin cans are employed as containers for the batches of substance being treated, the liquid must not detrimentally affect the metal of the cans, and if several basic liquids are used, these must not be immiscible to one another. The liquid should therefore have non-electrolytic properties, since an electrolytic heating solution would cause the tin cans ordinarily used, to rust and be otherwise degraded.

It has been found that glycerine or glyceral, $C_3H_5(OH)_3$, which in fact has food value in itself, and which has low specific heat (.54) and a high boiling point, is well suited as a basic liquid. Another suitable basic liquid is ethylene glycol, $C_2H_4(OH)_2$, which has about the same specific heat (.52) as glycerine, and also has a higher boiling point than water. These basic liquids may be readily mixed with water and with each other, and may also be separated from water and from each other by fractional distillation due to the differences in boiling points of the three liquids. While it may only be necessary to mix one of these basic liquids with the other, or to mix one or both of the basic liquids with water in order to carry on the process constituting the present improvement, it may also become desirable to vary the density or specific gravity of the heating solution in order to vary the degree of agitation of the food laden cans. This feature, however, forms the subject matter of a separate application, and will be referred to herein only incidentally, so that for the purposes of the present improvement it will only be necessary to refer to a basic liquid which may be either glycerine, ethylene glycol, or any other liquid having lower specific heat, a higher boiling point, and perhaps also greater density than that of water.

Now assuming that it is desired to sterilize a relatively delicate substance such as milk, batches of which have been hermetically sealed in containers such as cylindrical tin cans 20, sufficient of the basic liquid is mixed with pure water, to permit heating of the solution to a temperature sufficiently high in order to effect sterilization without transforming the heating liquid into vapor. The desired level of liquid 27 is established in the several chambers 11, 12, 13, or the partitions 14, 15 may be omitted so as to provide a single elongated treating chamber of suitable length thereby establishing only a single level throughout the machine. The can transporting rotor is then rotated at the proper speed, whereupon the successive food laden cans 20 admitted through the inlet 25 are advanced along a spiral path through the treating chambers and are eventually discharged through the outlet 26 to a suitable cooler of well known construction. If so desired, the final chamber 13 may be utilized for cooling purposes thereby making the unit complete in itself, but in this event the liquid in the final chamber may be ordinary water having proper cooling temperature.

As the successive cans 20 are submerged in the heating liquid 27 having relatively low specific heat but high temperature, the batches of food are gradually but quickly subjected to the sterilization temperature, throughout the masses, the low specific heat of the heating medium retarding the heat transfer sufficiently to prevent scorching, carmelization, or other detrimental action due to sudden application of high temperatures. The use of liquid having high specific heat, therefore greatly reduces the bringing up time without endangering the product, and the high boiling point of the treating liquid obviously eliminates necessity of maintaining the heating liquid 27 under pressure.

It will be apparent from the foregoing description, that the improved process is readily applicable in the treatment of various species of materials, by merely varying the proportions of basic liquid and water in the heating solution to suit the specific characteristics of the substance to be treated. The rate of heat penetration or transfer may be readily varied at will, by merely varying the specific heat of the solution, and the density or specific gravity may be likewise varied by the use of suitable proportions of basic liquid and water in solution, in case it is desired to vary the degree of agitation. The chambers 11, 12, 13 may be either completely or only partially filled with heating liquid 27, and in the latter event, the intermittent removal of the food laden cans from the heating bath has an improved effect on some products which are advantageously treated by alternate heating and cooling. When it becomes desirable to change the proportions of basic liquid and water in the heating medium, the ingredients may be readily separated by distillation, and subsequently remixed in proper proportions, thus making the process extremely flexible and adaptable to the treatment of a wide range of food products.

As herein above indicated, the process of varying the degree of agitation of products being treated by varying the specific gravity or density of the treating liquid, is being made the subject of a separate application, and this is also true of the combined process of varying the specific heat of the liquid and of varying the degree of agitation to control the heat penetration.

It should be understood that it is not desired to limit the present invention to the use of the basic liquids herein specifically referred to, since various modifications within the scope of the claims may occur to persons skilled in the art.

It is claimed and desired to secure by Letters Patent:

1. The process of heat treating edible substance, which comprises, transporting successive hermetically sealed batches of the substance for a definite period of time through a heated liquid having lower specific heat than that of pure water, and utilizing the said specific heat to control the rate of heat transfer.

2. The process of heat treating edible substance, which comprises, transporting batches of the substance concealed in metallic containers through a non-electrolytic heated liquid having lower specific heat than pure water, utilizing the non-electrolytic property of the liquid to avoid deterioration of the containers, and utilizing the said specific heat to control the rate of heat transfer.

3. The process of heat treating edible substance, which comprises, transporting batches of the substance through a heated solution of glycerol and ethylene glycol, and utilizing the special characteristics of said solution to control the rate of heat transfer.

4. The process of heat treating edible substance, which comprises, transporting successive hermetically sealed batches of the substance for a definite period of time through a heated liquid having a lower specific heat, greater density, and a higher boiling point than pure water, and utilizing said characteristics of the liquid to control the rate of heat transfer.

5. The process of heat treating edible substance, which comprises, intermittently transporting hermetically sealed batches of the substance through a heated liquid consisting of a mixture of water and ethylene glycol in predetermined proportions, and utilizing the characteristics of said mixture to control the rate of heat transfer.

6. The process of heat treating edible substance, which comprises, intermittently transporting hermetically sealed batches of the substance through a heated liquid consisting of a mixture of water and glycerol in predetermined proportions, and utilizing the characteristics of said mixture to control the rate of heat transfer.

7. The process of heat treating edible substance, which comprises, intermittently transporting hermetically sealed batches of the substance through a heated liquid consisting of a mixture of water, etheylene glycol and glycerol in predetermined proportions, and utilizing the characteristics of said mixture to control the rate of heat transfer.

In testimony whereof, I affix my signature.

FRANK D. CHAPMAN.